United States Patent

[11] 3,570,377

[72] Inventor Boris Gerber
 3807 W. Keeney, Skokie, Ill. 60076
[21] Appl. No. 832,361
[22] Filed June 11, 1969
[45] Patented Mar. 16, 1971

[54] EMBEDDED HIGHWAY REFLECTOR MARKER
 4 Claims, 3 Drawing Figs.
[52] U.S. Cl. ................................................... 94/1.5
[51] Int. Cl. .................................................. E01c 23/16
[50] Field of Search ...................................... 94/1.5

[56] References Cited
UNITED STATES PATENTS
3,093,038 6/1963 McRobbie ................... 94/1.5
3,373,667 3/1968 Taylor-Myers ............... 94/1.5

*Primary Examiner*—Jacob L. Nackenoff
*Attorney*—Silverman & Cass

ABSTRACT: A highway reflector-type marker comprising a base having an upstanding holder formation or box having an upwardly opening cavity, said base and box being of unitary construction and preferably of molded rubber. A resilient pad carrying light reflecting members or lens exposed at opposite ends of the pad is removably installed in the cavity with the lens exposed to reflect light from the headlamps of an oncoming vehicle impinging thereon. The pad and box cooperate to provide a reservoir for fluid such as rain water, and the pad is arranged to protrude above the upper end of the box and be compressed when it is run over by a vehicle to squirt a charge of fluid across the faces of lens for cleaning same.

Patented March 16, 1971
3,570,377
2 Sheets-Sheet 1
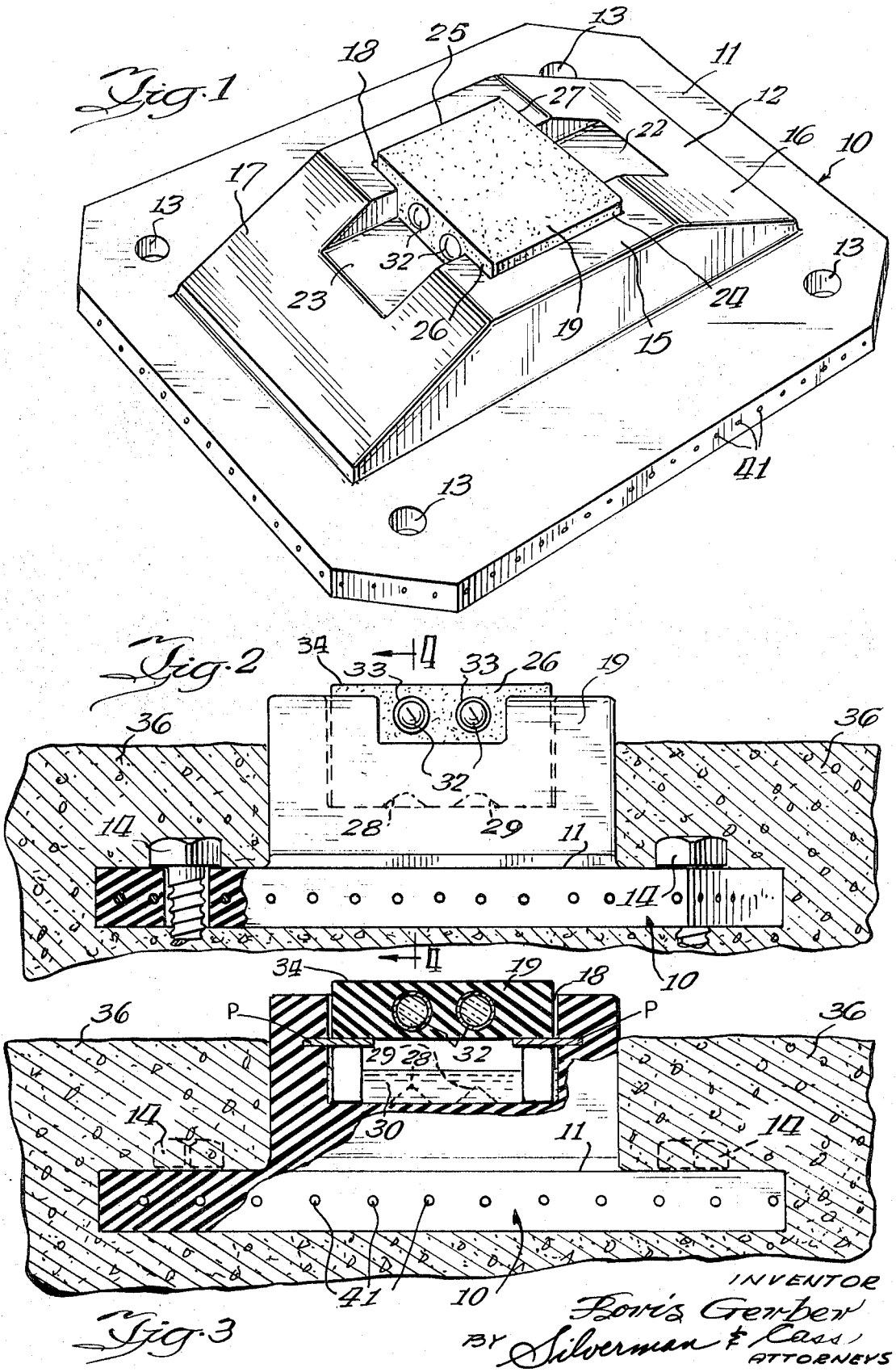
INVENTOR
Boris Gerber
BY Silverman & Cass
ATTORNEYS

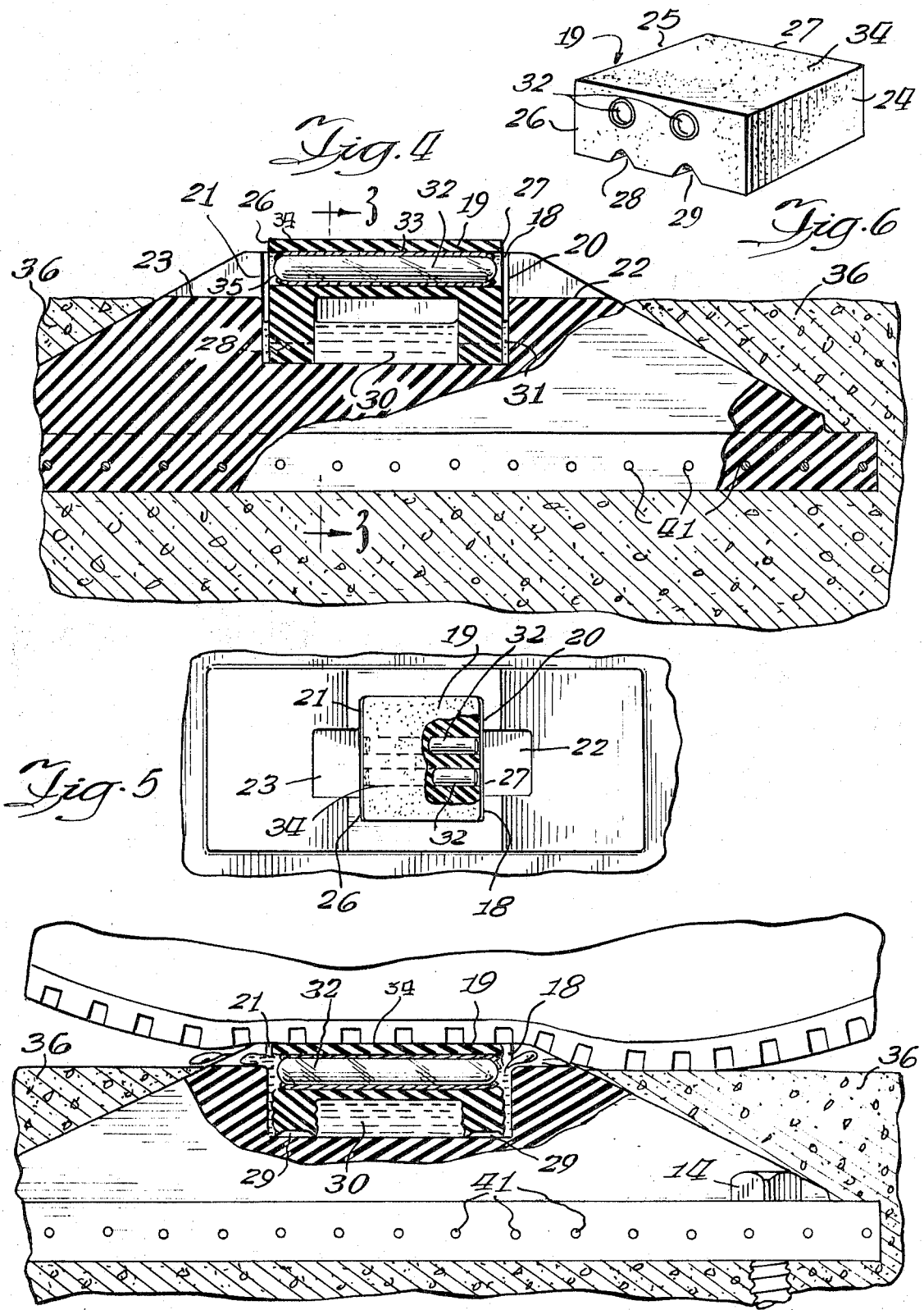

EMBEDDED HIGHWAY REFLECTOR MARKER

FIELD OF INVENTION

This invention relates generally to embedded road markers and more particularly, to an embedded road marker device having light reflecting lenses carried in a resilient rubber pad removably secured in a holder or box formation molded unitary or integral with the base of the device, said pad and box formation having cooperating fluid reservoir means for discharging fluid across the faces of the lenses for cleansing same when the pad is compressed by a vehicle tire running over the same.

PRIOR ART

The highway reflector-type marker of the herein invention is constructed to be embedded in the pavement of a road and present light reflector lenses above pavement level designed to reflect light rays from headlamps of an oncoming vehicle. Such reflector-type markers are representative generally of the types disclosed in U.S. Letters Pat. Nos. 2,703,038, 3,373,667, and 3,392,639. These prior art markers all protrude above road level when embedded and are arranged to delineate center lines, margin lines or other desired visible markings for alerting car drivers both during the day and at night. With the increased and ever increasing number of vehicles on the nation's highways, the desirability for such markers which are more efficient and proficient is readily appreciated.

The optimum features for such marker devices in terms of satisfactory construction include provision for keeping the reflector lenses clean and unmarred so that most efficient light reflection for the marker device will be maintained. Another important feature is durability and strength of the device since it is continuously subjected to hard punishment by reason of vehicles running over the same. Such durability and strength are even more advantageous when achieved with attendant economy of construction giving rise to a low-cost product which is conducive to more widespread general acceptance and use.

The road reflector markers of the prior art were less than satisfactory in some important respects. Generally, the were they were relatively expensive to manufacture and install. Further, the manner of construction therefore contemplated to provide for cleansing of the exposed faces of the reflector lenses was not entirely satisfactory either because of failure thereof to keep the lenses clean or if they did succeed in the cleansing function, the lenses frequently were marred, as by abrasion, in the process. In some instances, where so-called self-wiping of the lenses was achieved when a vehicle ran over the device, such wiping action tended to wear out the part to the lens holder which performed the wiping function over a long period of time.

OBJECTS OF THE INVENTION

This invention avoids the inadequacies of the prior art structures by providing an integral body structure combining the base and the holder. A resilient pad carrying the reflector lenses is mounted in the body structure, the holder and pad cooperating to provide a reservoir for a cleaning fluid, such as rain water accumulated therein.

The invention avoids wiper means for cleaning the lenses. Instead, cavities and recesses within the body structure and the pad cooperating to provide said reservoir are used to confine water therein which is ejected or discharged across the faces of the lenses to clean same when the pad is depressed by a pneumatic tire traveling thereover. Thus, scratching or damaging of the lenses by a contacting wiper construction is prevented.

According to the invention, the body structure preferably is of a molded hard rubber wherein the base part is provided with reinforcing steel wires. This arrangement ensures that the body, being of rubber, is flexible to a certain degree and yet sturdy and rugged and therefore, capable of supporting the holder and reflector means as well as withstanding the impact of vehicle tires passing thereover.

Another advantage offered by the present invention is a constructional feature providing that the top surface of resilient pad is not flush with the holder top surface as prevalent in the prior art devices. In the device, according to the invention, the pad projects upwardly of the holder portion. This feature assures that when a tire passes over the pad, the latter is depressed causing water in the cavities of pad and body structure to squirt and clean the lenses of the reflector elements, thus, obviating the use of special wiper means.

Accordingly, the principal object of the invention is the provision of a new and improved embedded road or highway reflector marker of a simplified construction assuring the desired features of visibility, ruggedness and flexibility with an economical and durable construction, as described above.

A further object of the invention is to provide a device as described including a body structure having base and holder parts molded as a unitary construction, preferably of a hard rubber material, although other materials and combination of materials are feasible.

It is still another object of the invention to provide a device as described in which the rubber base part has reinforcing wires therethrough, thus assuring the ruggedness and strength required for supporting the holder and the pad and withstanding impacts of approaching vehicles.

Another object of the invention is the provision of a reflector marker wherein the top of the resilient pad projects above the top of the holder part, and arranged to be compressed by pressure from a vehicle tire run over the same whereby to effect squirting of water across the lenses to clean the same without resorting to any abrading or wiping action.

SUMMARY OF THE INVENTION

A reflector marker constructed such as to be embedded in a road or highway, wherein the base portion is integral with the holding box, the base portion being a sturdy structure by virtue of preferably being made of a molded rubber material permeated with reinforcing wires, a resilient pad member being disposed in a cavity within the holding box but projecting beyond the top of the holding box, the pad member having an inner chamber for containing water and recesses in its walls, such that a vehicle tire can depress the resilient pad member, whereby the water is squeezed out of the chamber through the recesses and squirted across the lenses of the reflectors, to clean the same without the use of wipers or any abrading action.

BRIEF DESCRIPTION OF THE DRAWINGS

FIG. 1 is a perspective view of the highway reflector-type marker embodying the invention.

FIG. 2 is a front view of the reflector marker shown in an embedded and anchored position.

FIG. 3 is a cross-sectional view of the reflector marker taken along the line 3–3 of FIG. 4.

FIG. 4 is a fragmentary cross-sectional view of the reflector marker taken along lines 4–4 of FIG. 2.

FIG. 5 is a top plan view of the reflector marker and partially broken away to show details.

FIG. 6 is a perspective view of the resilient pad showing the location of lenses and the reservoir.

FIG. 7 is a fragmentary cross-sectional view of the reflector marker at a point of time when a vehicle tire runs over the same.

DESCRIPTION OF THE PREFERRED EMBODIMENT

Referring now to the drawings, FIG. 1 shows the body structure 10 molded of a hard rubber material comprising a base 11 and a holder 12 unitary or integral one with the other. The base 11 is a flat, generally rectangular body having holes 13 at corners thereof for receiving fastening means 14, seen in FIG. 2, with which the base 11 can be anchored to the ground. In order to reinforce the rubber base 11, steel wires as indicated at 41, are laid out in the mold when manufacturing the body structure 10, which wires extend through and permeate the base 11 to impart to it a high degree of sturdiness. It can be appreciated that the base 11 may be of circular or oval configuration as well.

The holder 12 is molded as a part of a body structure 10 on top of the base 11. The holder 12 is of an elongated, generally rectangular configuration except that the top surface 15 tapers downwardly in longitudinal direction as indicated by sloping surfaces 16, 17 to form ramps which facilitate vehicle tire passage thereover and provide a guideway for water to enter into the reservoir of the marker device.

Another way to achieve for the body structure 10 the desired degree of rigidity is to make it out of a cast metal, preferably cast iron.

In the center of the top surface 15, a cavity 18 is provided of rectangular configuration extending downwardly into the holder portion 12 for receiving a pad 19. On the two sides 20, 21 of the cavity 18, rectangular recesses 22, 23 are cut out in the holder portion 12 for providing access of light rays to and from lenses disposed in the pad 19, as described in detail hereinafter.

The pad 19 is made of resilient rubber material. It has a generally rectangular configuration and its sidewalls 24, 25 and front and rear walls 26, 27 have dimensions such that the pad can be readily and snugly fitted into the cavity 18 and removably secured therein by means of the pins P. In the lower end portion of the front and rear walls 26, 27 of the pad, access openings 28, 29 of semicircular cross section are provided in order to permit water contained in a chamber 30 within the pad to leave the chamber and pass to a clearance space 31 between the walls of the pad and the walls of the cavity 18. The walls 26 and 27 may be cut out in medial portions thereof to provide the access openings.

In the upper portion of the pad 19, there are provided two or more reflector elements 32 disposed in metal sleeves 33.

The pad 19 is of a height such that when installed in the cavity 18, the top surface 34 of the pad is not flush with the top surface of the holder 19 but projects therefrom upwardly by a certain amount.

In operation, when a vehicle tire passes over the reflector marker, as indicated in FIG. 7, the resilient pad is depressed whereby water confined in the chamber 30 is squeezed out of the chamber, passing through the recesses 28, 29 and upwardly through space 31 across the lens 35 with sufficient speed, thereby cleaning the same. The lateral sidewalls of the pad abut the facing lateral sidewalls of the cavity for achieving support for the pad during this compression of the pad.

The highway reflector marker is anchored in the ground by means of bolts 14 passing through holes 13 of the base into the ground as indicated in FIGS. 2, 3 and 7. After thus anchoring the marker, material 36 such as concrete or asphalt is filled in the space over the base and the lower part of the holder as illustrated in FIGS. 2, 3, 4 and 7.

I claim:

1. A highway reflector-type marker having a body structure adapted to be embedded in the pavement comprising:
   a. a base,
   b. a holder member integrally formed with said base, said holder being of elongated boxlike configuration opening at the top end thereof and having tapered ramp formations extending downwardly from the opposite front and rear ends thereof, said holder having an internal cavity extending downwardly from said top end thereof,
   c. compressible pad means having a top wall and front and rear walls depending therefrom, the pad means being removably secured in said cavity with the top wall thereof normally protruding beyond the top end of the holder, and said front and rear walls slightly spaced from the facing walls respectively of the cavity to provide clearance spaces therebetween,
   d. reflectors mounted in said pad means and having end faces exposed through suitable openings in said front and rear walls of said pad means,
   e. the top and front and rear walls of the pad means defining with the adjoining cavity walls of the holder an internal chamber to provide a reservoir for fluid entering into the chamber from said ramp formations and through said clearance spaces,
   f. said pad means constructed and arranged to be compressed by a vehicle tire run over the same whereby to slide downwardly within the cavity and express fluid from the reservoir upwardly through said clearance spaces to impinge upon the reflector end faces for cleaning same.

2. A highway marker as set forth in claim 1, wherein access openings are provided from the interior of the chamber through the front and rear walls of said pad means to said clearance spaces.

3. A highway marker as set forth in claim 2, wherein said access openings are disposed in the front and rear walls of the pad means below said reflector end faces.

4. A highway marker as set forth in claim 1 wherein said body structure is made of rubber material and the base is permeated with reinforcing steel wires.